Sept. 10, 1929.   W. R. BRIDGENS   1,727,334

JACKING DEVICE FOR MOTOR AND LIKE VEHICLES

Filed Dec. 6, 1928

INVENTOR
Walter Roy Bridgens
BY
Riegs, Boyes & Bakelar
ATTORNEY

Patented Sept. 10, 1929.

1,727,334

UNITED STATES PATENT OFFICE.

WALTER ROY BRIDGENS, OF RIVINGTON, ENGLAND.

JACKING DEVICE FOR MOTOR AND LIKE VEHICLES.

Application filed December 6, 1928, Serial No. 324,265, and in Great Britain November 26, 1927.

This invention has reference to motor vehicles and has for its object to provide means whereby jacks may be mounted on the vehicle in proximity to the wheels.

It has been proposed to provide motor and like vehicles with jacks secured to the wheel, which jacks are operated by hydraulic or other means from a central pressure or power point. It is clear that in fixing such jacks to the axles considerable holding power is required to prevent the jacks from moving in their securing means when they have to sustain the weight of the vehicle, and the pressure required to hold the jacks firmly in position may be such as to cause deflection in the jacks and such deflections would impair or might completely prevent the working of the jacks.

According to this invention jacks are mounted on the axles by being passed through or into holes provided within swells, lugs or extensions formed in or upon the axles of the vehicles.

Figure 2:
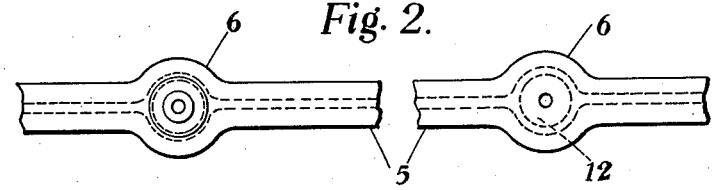
Figure 3:
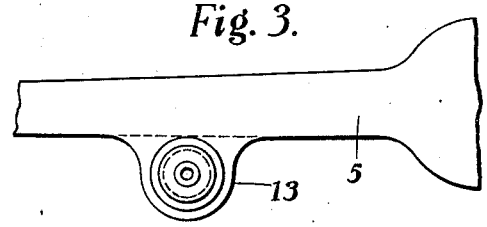
Figure 4:
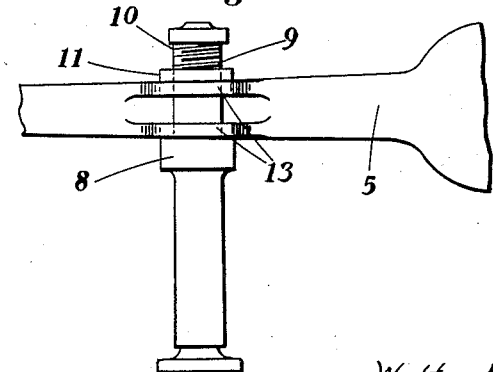

The invention is more particularly set forth with reference to the accompanying drawings wherein in Fig. 1 two applications of the invention are shown in elevation, the corresponding plan views being shown in Fig. 2, while Figs. 3 and 4 are respectively a plan and elevation showing the application of the invention to a back axle.

Figure 1:
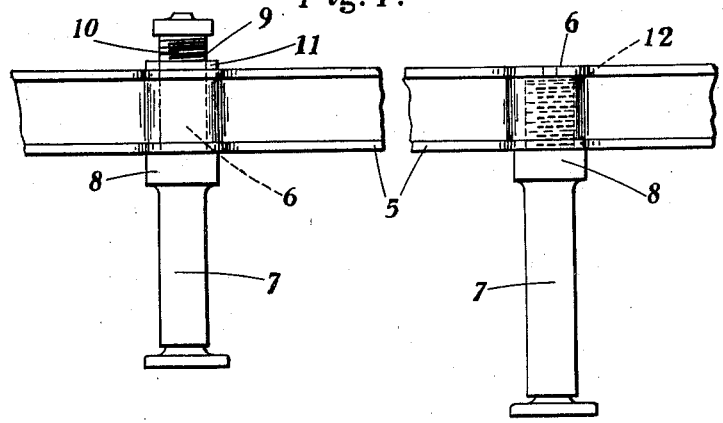

Referring first to Figs. 1 and 2 wherein the invention is shown as applied to the front axle of a motor vehicle the axle 5 is made with enlargements or swells 6 in proximity to the wheels not shown in the drawings. These enlargements or swells 5 are then bored, the hole being such as to allow the jacks 7 to be inserted from the underside. The jacks 7 have upon them rings or flanges 8 which will engage the underside of the axle when the jacks are pushed home. The parts 9 of the jacks projecting above the axle are provided with screw threads 10 on which securing rings 11 may be run.

By this means the jacks 7 are held to prevent them falling out by the securing rings 11 and when the jacks are called upon to take the weight of the vehicle they do this without any lateral pressure being applied to the walls of the jacks, such as would be required if the jacks were held in clamps.

According to a modification and as shown in the right hand views in Figs. 1 and 2 the holes or lugs and the jacks 7 may be so arranged that the jacks 7 do not pass through the holes but are screwed at the head 12 and inserted by screwing them home from the underside or if desired they may be a smooth fit and held in by a cross pin running through the axle. In such constructions the holes in which the jacks are placed may have a cup or cover which forms the head of the jacks and to which the pipe connection is made.

As shown in Figs. 3 and 4 where it is found not convenient or desirable to form the axle as described and as shown in Figs. 1 and 2 and always when the invention is applied to a backaxle, lugs or projections 13 are formed on or are secured to the axles, such lugs or projections being bored to receive the jacks 7 in either manner shown in Figs. 1 and 2.

If desired the lugs or swells may be made on the underside of the axle and where this is done and the jack is inserted as shown in the right hand view of Figs. 1 and 2 a direct jacking pressure under the axis of the axle can be obtained without penetrating the axle.

What I claim as my invention and desire to secure by Letters Patent is:—

1. The combination with a vehicle axle having a lateral enlargement in spaced relation to each end, each of said enlargements having a vertically disposed opening therein; of a jack casing having an upper portion extending into said opening, a collar fixed on said casing and bearing against the underside of the axle around said opening, and a plunger in the casing and protractable downwardly therefrom, said casing having an opening in its upper end for the admission and exhaust of fluid under pressure.

2. The combination with a vehicle axle having a lateral enlargement in spaced relation to each end, each of said enlargements having a vertically disposed opening therein; of a jack casing having an upper portion extending into said opening, a collar fixed on said casing and bearing against the underside of the axle around said opening, a plunger in the casing and protractable downwardly therefrom, the upper end of said casing being threaded externally and projecting above said axle, a nut on said threaded end bearing on the axle, and a cap on the casing provided with a fluid port whereby fluid under pressure may be admitted to and exhausted from said jack.

3. The combination with a vehicle axle having a lateral enlargement in spaced relation to each end, each of said enlargements having a vertically disposed opening therein, said opening having its axis intersecting the axis of said axle; of a jack casing having an upper portion extending into said opening, a collar fixed on said casing and bearing against the underside of the axle around said opening, and a plunger in the casing and protractable downwardly therefrom, said casing having an opening in its upper end for the admission and exhaust of fluid under pressure.

4. The combination with a vehicle axle having a lateral enlargement in spaced relation to each end, each of said enlargements having a vertically disposed opening therein, said opening having its axis intersecting the axis of said axle; of a jack casing having an upper portion extending into said opening, a collar fixed on said casing and bearing against the underside of the axle around said opening, a plunger in the casing and protractable downwardly therefrom, the upper end of said casing being threaded externally and projecting above said axle, a nut on said threaded end bearing on the axle, and a cap on the casing provided with a fluid port whereby fluid under pressure may be admitted to and exhausted from said jack.

In testimony whereof I have signed my name to this specification.

WALTER ROY BRIDGENS.